(12) United States Patent
Shiiyama

(10) Patent No.: US 8,077,976 B2
(45) Date of Patent: Dec. 13, 2011

(54) IMAGE SEARCH APPARATUS AND IMAGE SEARCH METHOD

(75) Inventor: Hirotaka Shiiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 926 days.

(21) Appl. No.: 11/598,026

(22) Filed: Nov. 13, 2006

(65) Prior Publication Data

US 2007/0122037 A1    May 31, 2007

(30) Foreign Application Priority Data

Nov. 25, 2005   (JP) .................. 2005-340918

(51) Int. Cl.
*G06K 9/46* (2006.01)
(52) U.S. Cl. .............. 382/190; 382/181; 382/224
(58) Field of Classification Search .......... 382/181, 382/190, 223, 305, 306, 284
See application file for complete search history.

(56) References Cited

U.S. PATENT DOCUMENTS

| | | | |
|---|---|---|---|
| 7,075,683 B1 | 7/2006 | Shiiyama | 358/452 |
| 7,233,945 B2 | 6/2007 | Shiiyama | 707/4 |
| 7,639,839 B2 | 12/2009 | Chiu et al. | 382/103 |
| 2004/0243602 A1* | 12/2004 | Shiiyama | 707/100 |
| 2005/0220348 A1* | 10/2005 | Chiu et al. | 382/194 |
| 2006/0045350 A1* | 3/2006 | Itoh et al. | 382/209 |
| 2006/0110073 A1 | 5/2006 | Matsushita et al. | 382/305 |
| 2006/0120627 A1 | 6/2006 | Shiiyama | 382/305 |
| 2006/0164702 A1 | 7/2006 | Shiiyama | 358/537 |
| 2006/0195858 A1 | 8/2006 | Takahashi et al. | 725/19 |

FOREIGN PATENT DOCUMENTS

| | | |
|---|---|---|
| JP | 03-174658 | 7/1991 |
| JP | 9-231376 | 9/1997 |
| JP | 10-171826 | 6/1998 |
| JP | 2004-355370 | 12/2004 |
| JP | 2004355370 A | 12/2004 |
| JP | 2005-293576 | 10/2005 |
| JP | 2006-065764 | 3/2006 |
| WO | 2004/095374 | 11/2004 |

OTHER PUBLICATIONS

Japanese Office Action dated Dec. 20, 2010 in corresponding Japanese Application No. 2005-340918.

* cited by examiner

*Primary Examiner* — Brian Q Le
*Assistant Examiner* — Edward Park
(74) *Attorney, Agent, or Firm* — Fitzpatrick, Cella, Harper & Scinto

(57) ABSTRACT

Of the feature amounts of respective regions on an image, a region having a feature amount which is similar to that of a region of interest on a image is specified (S1307). Of the OCR results of the respective regions on the image, a region having an OCR result which matches that of the region of interest on the image is specified (S1308). Regions corresponding to respective regions on the image of the respective regions are specified based on the layout order of the specified regions (S1311). Of the regions obtained by combining neighboring regions on the image, a region corresponding to an inclusion region that includes each specified region is specified (S1314).

13 Claims, 19 Drawing Sheets

IMAGE ID = 2

FIG. 6

| NUMBER OF REGISTERED IMAGES | NUMBER OF REGISTERED REGIONS |
|---|---|
| 2 | 6 |

FIG. 7

| IMAGE ID | NUMBER OF BITS | IMAGE SIZE | IMAGE DATA STORAGE PATH |
|---|---|---|---|
| 1 | 32 | 70, 125 | C:¥cano¥demo¥img000001.bmp |
| 2 | 32 | 100, 100 | C:¥cano¥demo¥img000002.bmp |

FIG. 8

| IMAGE ID | REGION ID GROUP | OUTERMOST CIRCUMSCRIBING REGION | IMAGE DATA IN OUTERMOST CIRCUMSCRIBING REGION | OCR RESULT | IMAGE FEATURE AMOUNT IN OUTERMOST CIRCUMSCRIBING REGION |
|---|---|---|---|---|---|
| 1 | 1, 2, 3, 4, 5 | (20, 20)—(115, 60) | ·, ·, ·, ·, · | NULL, V, NULL | ·, ·, ·, ·, · |
| 2 | 6 | (10, 10)—(100, 100) | ·, ·, ·, ·, · | NULL | ·, ·, ·, ·, · |

FIG. 9

| REGION ID | PREVIOUS REGION ID | NEXT REGION ID | REGION COORDINATE POSITION | REGION SIZE | OCR RESULT | OCR LIKELIHOOD | IMAGE FEATURE AMOUNT |
|---|---|---|---|---|---|---|---|
| 1 | NULL | 2 | (20, 20)–(40, 60) | (20, 40) | NULL | NULL | ·, ·, ·, ·, · |
| 2 | 1 | 3 | (45, 20)–(60, 60) | (15, 40) | V | 80 | ·, ·, ·, ·, · |
| 3 | 2 | NULL | (75, 20)–(115, 60) | (40, 40) | NULL | NULL | ·, ·, ·, ·, · |
| 4 | NULL | 3 | (20, 20)–(60, 60) | (40, 40) | NULL | NULL | ·, ·, ·, ·, · |
| 5 | 1 | NULL | (45, 20)–(115, 60) | (70, 40) | NULL | NULL | ·, ·, ·, ·, · |
| 6 | NULL | NULL | (10, 10)–(100, 100) | (90, 90) | NULL | NULL | ·, ·, ·, ·, · |

FIG. 15

IMAGE INFORMATION SCHEMA

| DOCUMENT IMAGE ID | NUMBER OF REGIONS | IMAGE DATA STORAGE ADDRESS |
|---|---|---|
| 1 | 3 | 0x0abcdefg |

FIG. 16

| REGION ID | PREVIOUS REGION ID | NEXT REGION ID | REGION COORDINATE POSITION | REGION SIZE | OCR RESULT | OCR LIKELIHOOD | IMAGE FEATURE AMOUNT |
|---|---|---|---|---|---|---|---|
| 1 | NULL | 2, 3 | (20, 20)–(60, 60) | (35, 40) | NULL | NULL | ·, ·, ·, ·, ·, · |
| 2 | 1 | NULL | (75, 25)–(115, 55) | (40, 30) | NULL | NULL | ·, ·, ·, ·, ·, · |
| 3 | 1 | NULL | (130, 100)–(180, 150) | (50, 50) | NULL | NULL | ·, ·, ·, ·, ·, · |

FIG. 17

|   | 1 | 2 | 3 | 4 | 5 | 6 | 7 | 8 | · · · · · |
|---|---|---|---|---|---|---|---|---|---|
| 1 | 0 | 1 | 1 | 5 | 1 | 5 | 7 | 7 | · · · · · |
| 2 |   | 0 | 2 | 1 | 1 | 7 | 2 | 5 | · · · · · |
| 3 |   |   | 0 | 7 | 1 | 1 | 5 | 2 | · · · · · |
| 4 |   |   |   | 0 | 1 | 9 | 1 | 7 | · · · · · |
| ⋮ |   |   |   |   |   |   |   |   |   |

F I G. 18
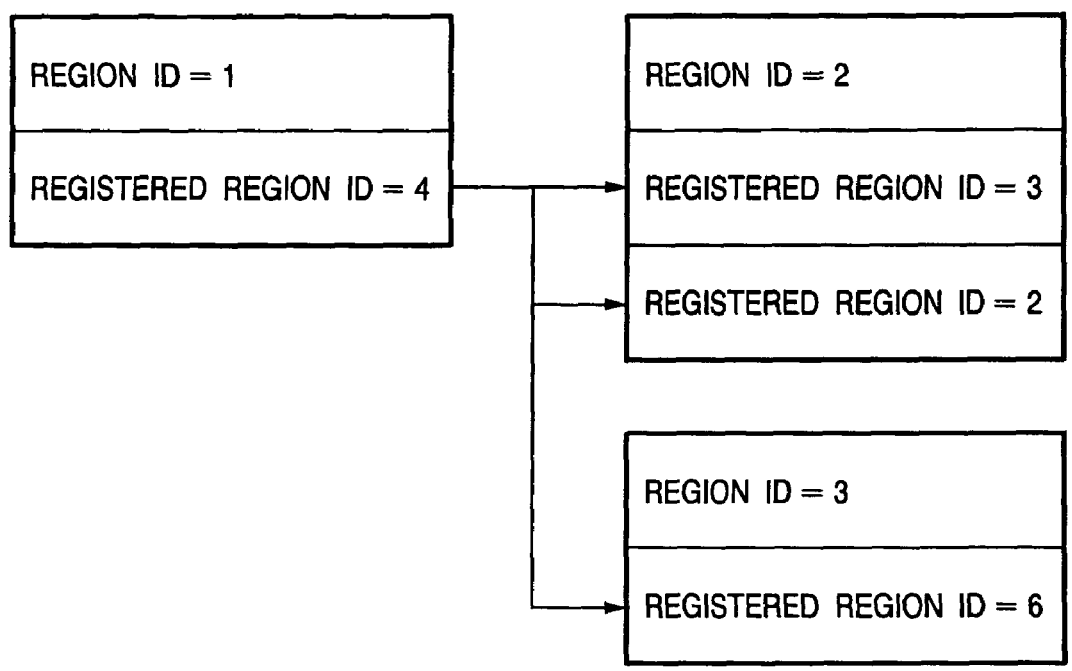

IMAGE SEARCH APPARATUS AND IMAGE SEARCH METHOD

BACKGROUND OF THE INVENTION

1. Field of the Invention

The present invention relates to a technique for handling an image including characters, symbols, and the like.

2. Description of the Related Art

The invention described in Japanese Patent Laid-Open No. 3-174658 implements extraction of a logo region by paying attention to the singularity of the logo color, but does not mention about a logo search. The invention described in Japanese Patent Laid-Open No. 10-171826 conducts a similar image search using image objects.

However, such prior arts implement a non-strict search using image feature amounts, and do not strictly search a logo. In order to search for a single logo mark in detail, after an object search is conducted, simple template matching is required. However, such technique does not cover any logo formed by a plurality of objects whose regions stick together (such state occurs when text regions are interlaced) at times or are separate from each other at other times.

In this way, as for a logo (e.g., family crest of paulownia) extracted as a single object, an image feature amount search or template matching for respective objects is conducted. However, in case of a logo which does not form one cluster, i.e., a text-based logo, objects are extracted for respective characters, and such characters may be recognized by an OCR or may not be recognized and handled as images since they are design characters. Therefore, there is no effective search method.

Therefore, the problem is to implement a technique that conducts a logo search robust against a logo from which objects are extracted for respective characters in case of a logo which is extracted as a single object, and a logo that does not form one cluster, i.e., a text-based logo.

The present invention has been made in consideration of the aforementioned problems, and has as its object to provide a technique that allows a robust search for a logo in an image.

SUMMARY OF THE INVENTION

In order to achieve an object of the present invention, for example, an image processing apparatus of the present invention comprises the following arrangement.

That is, an image processing apparatus comprising:
a image input unit adapted to input a image;
a partial region extraction unit adapted to extract a partial region from the image;
a feature amount extraction unit adapted to extract a feature amount of the extracted partial region;
a first determination unit adapted to determine a similarity between the extracted feature amount and a feature amount of a partial region of a registered image which is registered in advance in a database;
a first setting unit adapted to set a region in the image based on the registered image corresponding to the partial region which is determined by the first determination unit to have a high similarity; and
a second determination unit adapted to determine a similarity between a feature amount of the region set by the first setting unit and the feature amount of the registered image.

In order to achieve an object of the present invention, for example, an image processing method of the present invention comprises the following arrangement.

That is, an image processing method comprising:
a image input step of inputting a image;
a partial region extraction step of extracting a partial region from the image;
a feature amount extraction step of extracting a feature amount of the extracted partial region;
a first determination step of determining a similarity between the extracted feature amount and a feature amount of a partial region of a registered image which is registered in advance in a database;
a first setting step of setting a region in the image based on the registered image corresponding to the partial region which is determined in the first determination step to have a high similarity; and
a second determination step of determining a similarity between a feature amount of the region set in the first setting step and the feature amount of the registered image.

In order to achieve an object of the present invention, for example, a data structure of the present invention comprises the following arrangement.

That is, a data structure of an image to be stored in a database used by an image processing apparatus, comprising:
information indicating a storage position of image data;
feature amounts of a plurality of regions obtained by segmenting the image data;
information indicating a relationship between the plurality of neighboring regions; and
sizes of the plurality of regions.

Further features of the present invention will become apparent from the following description of exemplary embodiments with reference to the attached drawings.

BRIEF DESCRIPTION OF THE DRAWINGS

FIG. 6 shows an example of the configuration of index management information;

FIG. 7 shows an example of the configuration of a table used to register a set (image management information);

FIG. 8 shows an example of the configuration of a table used to register object information;

FIG. 9 shows an example of the configuration of a table that describes the relationship between previous and next regions designated by respective region IDs;

FIG. 15 shows information created as a result of the processing in step S102;

FIG. 16 shows an example of the configuration of a table that describes the relationship between previous and next regions;

FIG. 17 shows an example of penalty data;

FIG. 18 is a view used to explain details of the processing in step S1311; and

DESCRIPTION OF THE EMBODIMENTS

Preferred embodiments of the present invention will be described in detail hereinafter with reference to the accompanying drawings.

First Embodiment

Figure 1:
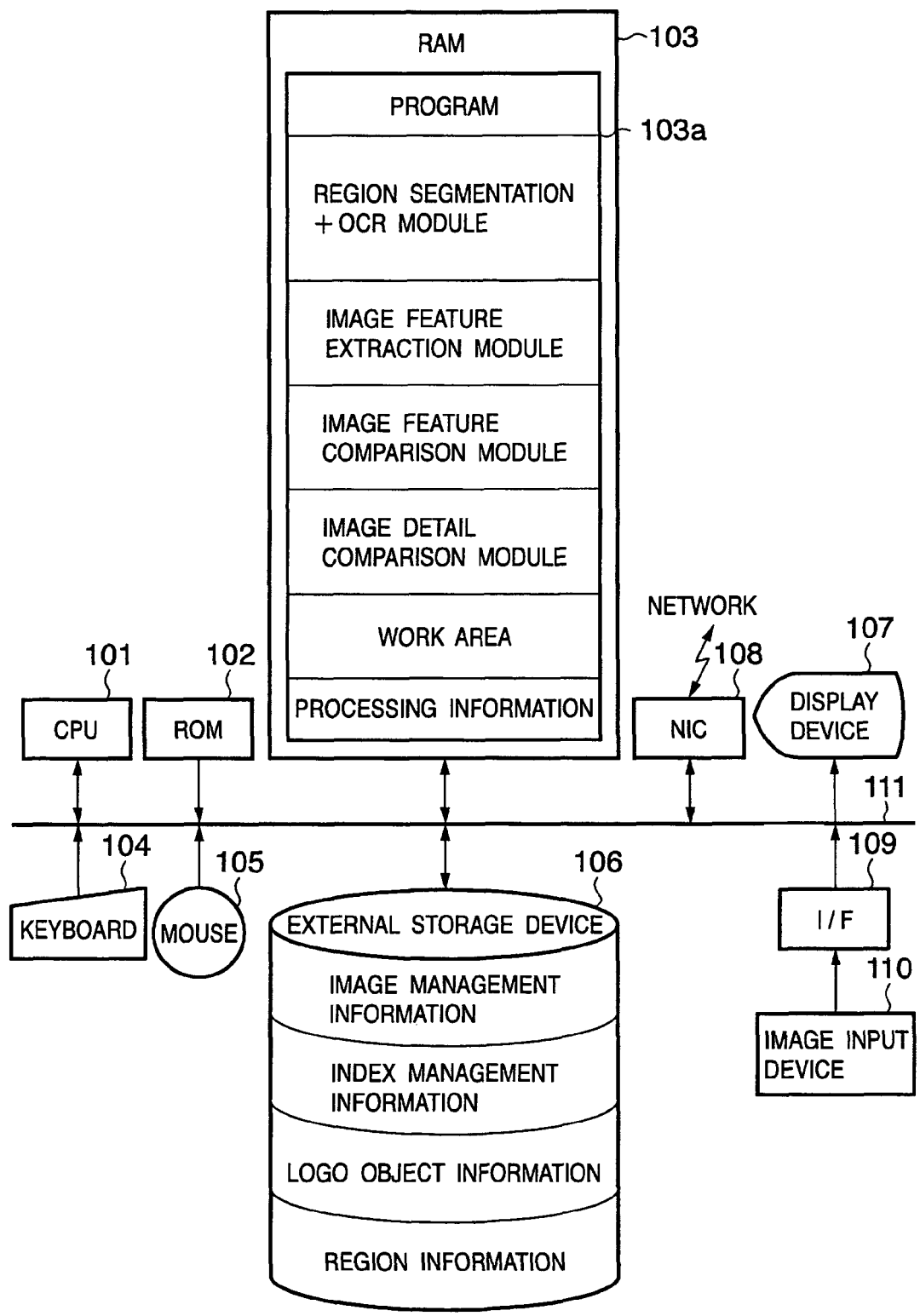
FIG. 1 is a block diagram showing the hardware arrangement of a computer which can be applied to an image processing apparatus according to the first embodiment of the present invention.

FIG. 1 is a block diagram showing the hardware arrangement of a computer which can be applied to an image processing apparatus according to this embodiment. Referring to FIG. 1, reference numeral 101 denotes a CPU which controls the overall computer using programs and data stored in a ROM 102 and RAM 103, and executes various processes to be described later to be implemented by the computer.

Reference numeral 102 denotes a ROM which stores setting data, a boot program, and the like of this computer.

Reference numeral 103 denotes a RAM which has an area for temporarily storing programs and processing information of various modules denoted by reference numeral 103a in FIG. 1, and also a work area used by the CPU 101 upon executing respective processes to be described later. Note that the RAM 103 has areas which can be provided as needed in addition to the above areas. The operations of various modules will be described later.

Reference numerals 104 and 105 respectively denote a keyboard and mouse. When the operator of this computer operates the keyboard 104 and mouse 105, he or she can input various instructions to the CPU 101.

Reference numeral 106 denotes an external storage device which is a large-capacity information storage device represented by a hard disk, and saves an OS (operating system), and various kinds of information, as shown in FIG. 1. These programs and information are loaded onto the RAM 103 as needed under the control of the CPU 101, and are to be processed by the CPU 101. Various tables which will appear in the following description are created and saved in the external storage device 106, and are loaded onto the RAM 103 when they are used.

Reference numeral 107 denotes a display device which comprises a CRT, liquid crystal display, or the like, and can display the processing results of the CPU 101 by means of images, text, and the like.

Reference numeral 108 denotes an NIC (network interface controller) which is used to connect this computer to a network such as a LAN, the Internet, and the like. This computer makes data communications with various apparatuses connected on the network via this NIC 108.

Reference numeral 110 denotes an image input apparatus, which comprises an apparatus such as a digital camera, scanner apparatus, or the like used to input an image to this computer. An image input by the image input apparatus 110 is output to the external storage device 106 and the RAM 103 via an I/F (interface) 109 and bus 111.

Reference numeral 111 denotes a bus which interconnects the aforementioned units.

The processing to be executed by the computer with the above arrangement will be described below.

<Logo Registration Processing>

Figure 2:
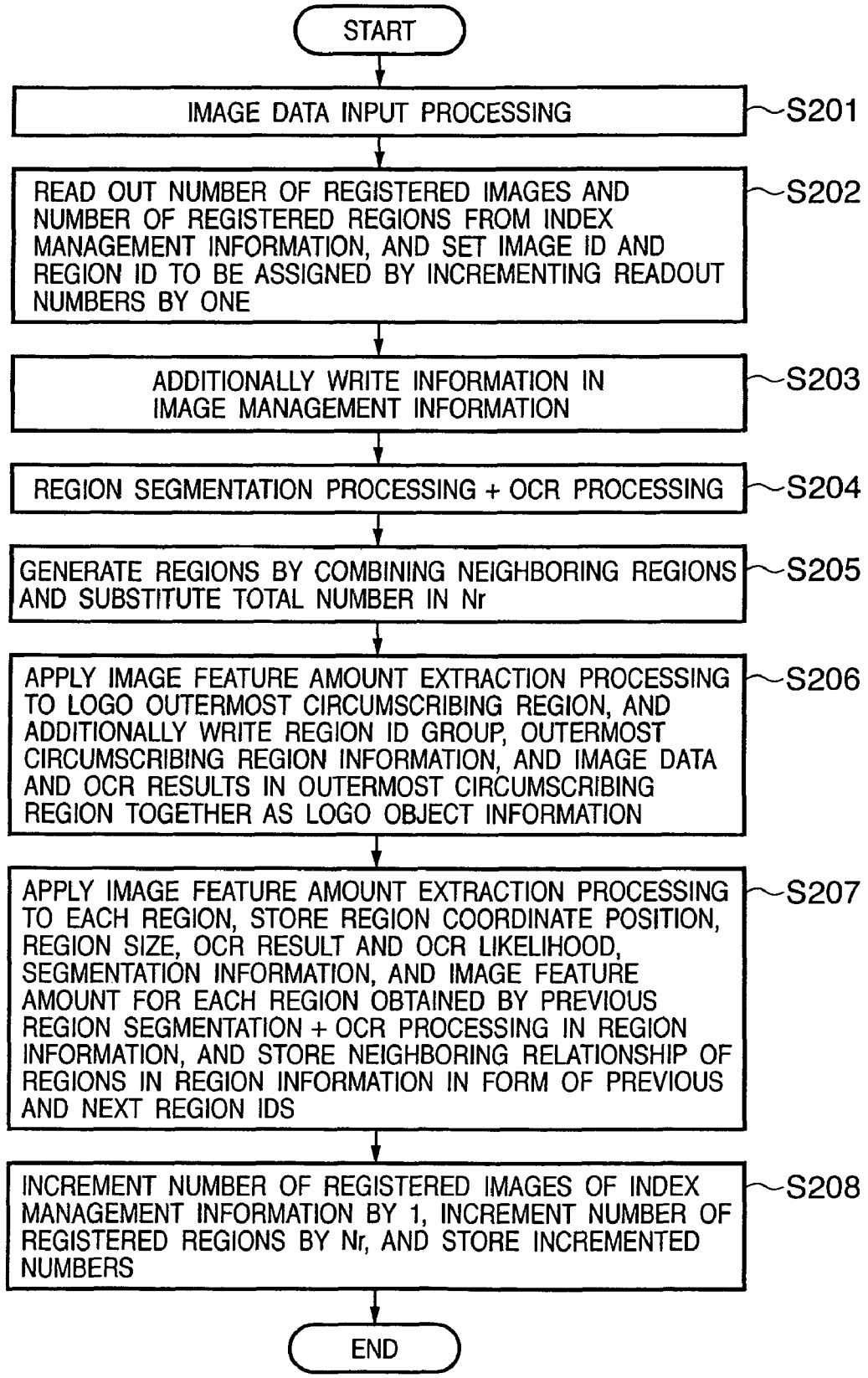
FIG. 2 is a flowchart of the processing for registering in an external storage device 106 a logo in an image which is input to the computer by an image input apparatus 110.

FIG. 2 is a flowchart of the processing for registering in the external storage device 106 a logo in an image input by the image input apparatus 110 to this computer. Note that programs and data for making the CPU 101 execute the processing according to the flowchart of FIG. 2 are saved in the external storage device 106. These programs and data are loaded onto the RAM 103 as needed under the control of the CPU 101. When the CPU 101 executes the processing using these programs and data, the computer executes respective processes to be described below.

The CPU 101 acquires image data input from the image input apparatus 110 onto the RAM 103 (step S201). Note that various other image acquisition modes onto the RAM 103 are available. For example, the CPU 101 may acquire image data from an external apparatus via the NIC 108 or it may acquire an image saved in advance in the external storage device 106 onto the RAM 103.

The CPU 101 then reads out index management information saved in the external storage device 106, and sets an image ID and region ID by respectively incrementing the number of registered images and the number of registered regions by one, which are included in the readout index management information (step S202). FIG. 6 shows an example of the configuration of the index management information. As shown in FIG. 6, the index management information includes the number of image IDs and that of region IDs issued to images which are currently registered in the external storage device 106.

Referring back to FIG. 2, the CPU 101 registers a set of the image ID obtained in step S202 as an ID for the image input in step S201, the number of bits per pixel of this image, the image size, and the registration (storage) path to the external storage device 106 in a table having the configuration shown in FIG. 7 (step S203). Note that the number of bits per pixel and image size can be acquired with reference to a header appended to the image data. FIG. 7 shows an example of the configuration of the table used to register this set (image management information).

Figure 4:
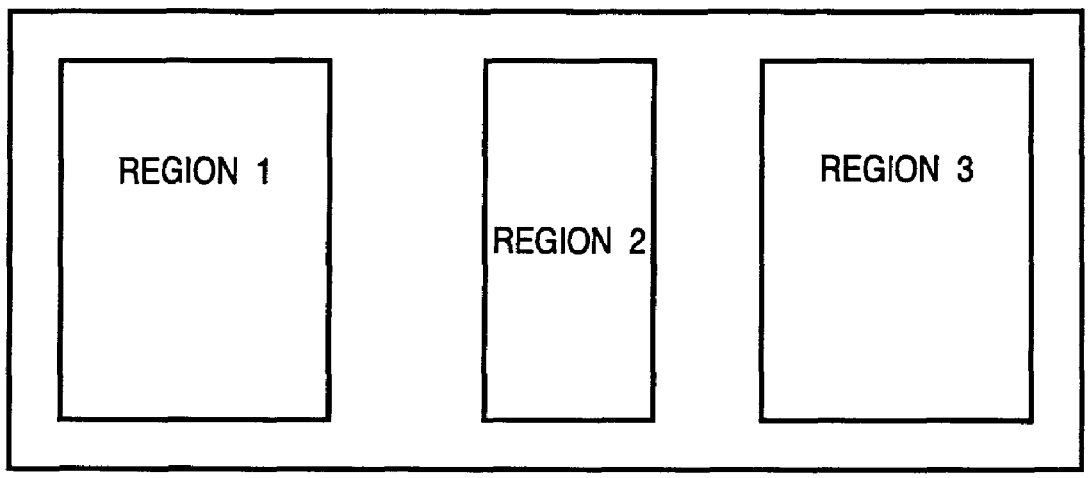
FIG. 4 shows an example of an image acquired in step S201.
Figure 5:
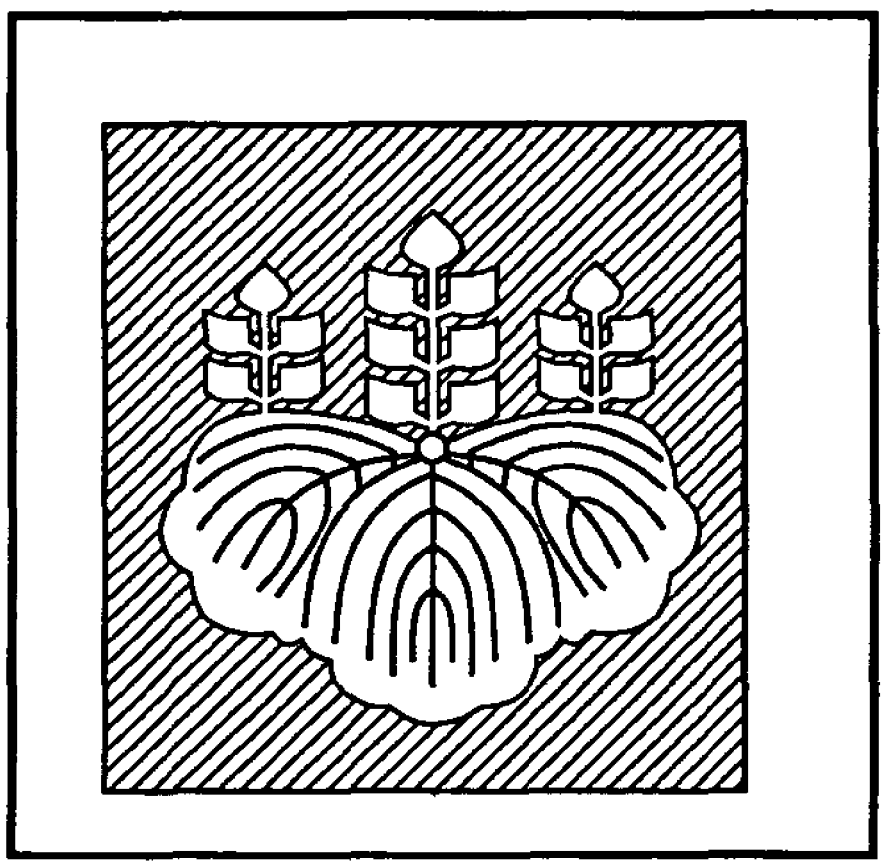
FIG. 5 shows an example of an image acquired in step S201.

FIGS. 4 and 5 respectively show an example of images acquired in step S201. As shown in FIGS. 4 and 5, when the images shown in FIGS. 4 and 5 are input in this order, image IDs=1 and 2 are assigned in turn to these images.

The CPU 101 loads a program of a region segmentation+ OCR module onto the RAM 103 and executes the loaded program so as to apply region segmentation processing and OCR processing to the image input in step S201 (step S204). With these processes, the CPU 101 segments a logo in an image into characters or symbols, and recognizes characters in respective segmented regions. In this step, the user may manually adjust the positions of characters or symbols in the logo so that the characters (or symbols) which form the logo undergo the OCR processing one by one.

Figure 3:
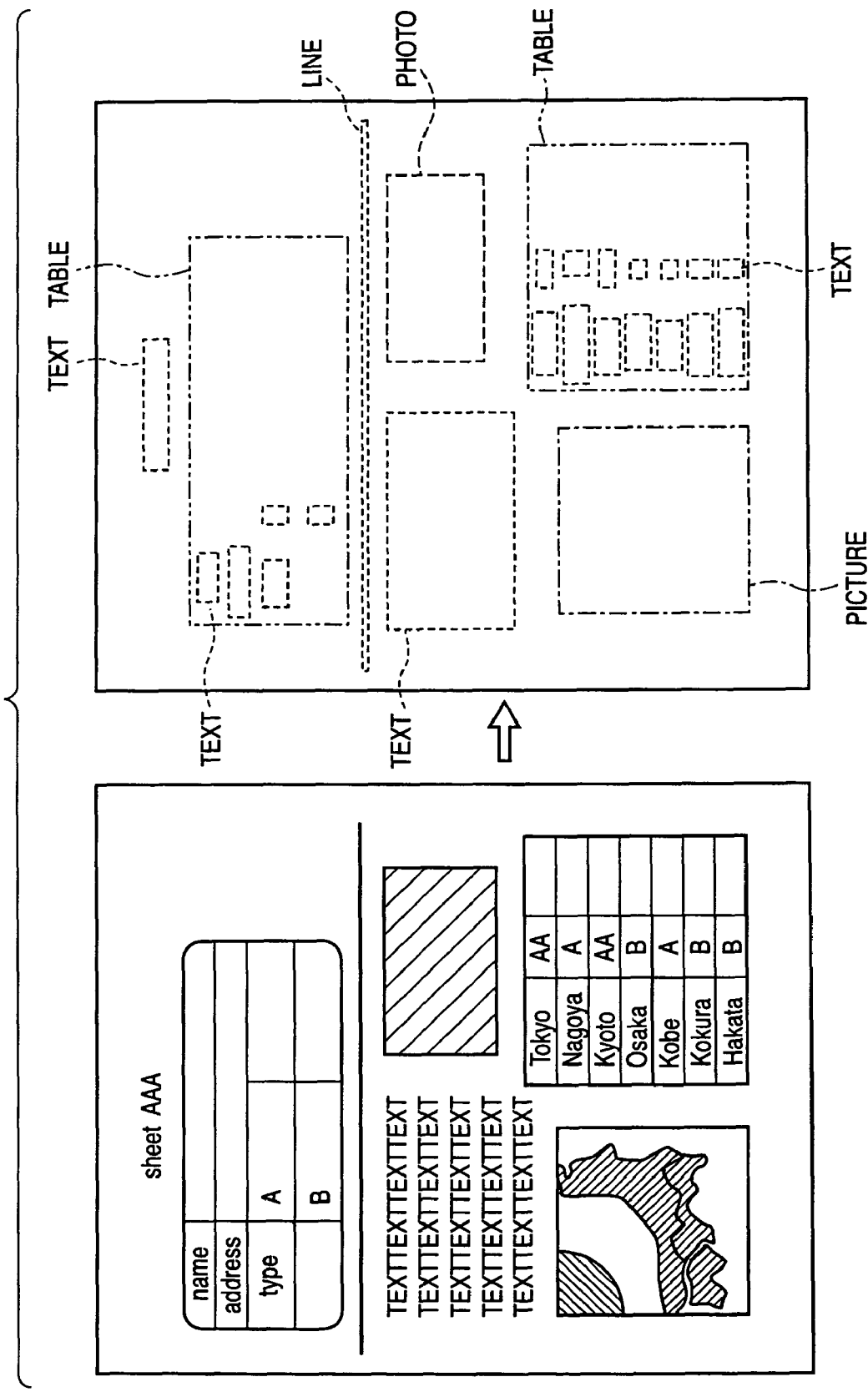
FIG. 3 shows an example of an image which is to undergo region segmentation (or block selection) processing.

The region segmentation processing will be described below using FIG. 3. Upon applying the region segmentation processing to an image shown on the right side of FIG. 3, the image is segmented into regions for respective objects such as text, a table, and the like, and the property (one of text, picture, photo, line, table, and the like) of each individual object is determined, as shown on the left side of FIG. 3.

In such processing, an input image is binarized to a monochrome image, and a cluster of pixels bounded by black pixels is extracted by outline tracing. For a cluster of black pixels with a large area, outline tracing is also applied to white pixels in that cluster to extract clusters of white pixels, and clusters of black pixels are recursively extracted from the interior of each cluster of white pixels having a predetermined area or more.

The obtained clusters of black pixels are classified into regions having different properties in accordance with their sizes and shapes. For example, a pixel group which has an aspect ratio close to 1, and has a size that falls within a predetermined range is determined as that corresponding to a character. Furthermore, a region where neighboring characters regularly line up and can be grouped is determined as a text region. Also, a low-profile pixel group is categorized as a line region, a range occupied by black pixel groups that include rectangular white pixel groups which regularly line up is categorized as a table region, a region where pixel groups with indeterminate forms are distributed is categorized as a photo region, a pixel group with an arbitrary shape other than the above properties is categorized as a picture region, and so forth.

In partial region extraction processing, a photo region in which pixel groups with indeterminate forms are distributed is determined as an image region, and the coordinate position which expresses the region and the property of that region, i.e., an image or text region, are output as an extraction result.

The OCR processing will be briefly explained below. The OCR processing calculates an image feature amount such as edge direction components and the like of thin line information of a pixel group corresponding to a character, and compares it with an image feature amount which is stored in a dictionary as a pair with a character code, thus recognizing the character which corresponds to the pixel group corresponding to the character.

Since the aforementioned region segmentation+OCR processing is a known technique, no further explanation will be given.

Referring back to FIG. 2, the CPU 101 obtains the number of combinations of neighboring regions (combined regions) in regions segmented in step S204, and substitutes the total of the number of combinations and the number of segmented regions in a variable Nr (step S205). For example, when an image describes five characters "Abcde" as a logo, the CPU 101 obtains a region of "A" (to be referred to as region A hereinafter), a region of "b" (to be referred to as region b hereinafter), a region of "c" (to be referred to as region c hereinafter), a region of "d" (to be referred to as region d hereinafter), and a region of "e" (to be referred to as region e hereinafter) in step S204. In step S205, the CPU 101 calculates the number of combinations of combined regions. In this case, there are nine combinations of combined regions, i.e., "Ab", "Abc", "Abcd", "bc", "bcd", "bcde", "cd", "cde", and "de". Since the number of segmented regions is "5" (five regions A to e), a value "14" is substituted in Nr.

In step S206, upon lining up the 14 regions (the five segmented regions+the nine combined regions), the CPU 101 assigns the region ID issued in step S202 to the first region, and assigns a region ID to each of the subsequent regions by incrementing the region ID by one. That is, assuming that regions A to e, region "Ab", region Abc", region "Abcd", region "bc", region "bcd", region "bcde", region "cd", region "cde", and region "de" line up, the CPU 101 assigns the region ID issued in step S202 to region A, and assigns (the region ID issued in step S202+1) to (the region ID issued in step S202+13) to regions b to "de", respectively.

In step S206, the CPU 101 then registers sets of the image ID issued in step S202 to the image input in step S201, the region IDs assigned to respective regions, the coordinate positions on this image of circumscribing rectangles of the respective regions, image data in the respective regions, and the OCR results of the respective regions in a table shown in FIG. 8. Assume that the OCR result for each combined region is "NULL" (no character recognition result). FIG. 8 shows an example of the configuration of the table used to register object information.

As shown in the table of FIG. 8, the object information includes an image feature amount (that of an outermost circumscribing region) in each region in addition to the aforementioned elements. The CPU 101 obtains the image feature amount in step S207.

In step S207, the CPU 101 applies image feature amount extraction processing to the image in each of the 14 regions, and registers the extracted feature amounts in the tables shown in FIGS. 8 and 9. Various kinds of image feature amount extraction processing are available. As an example of such various kinds of processing, color feature information extraction processing will be described below.

Figure 11:
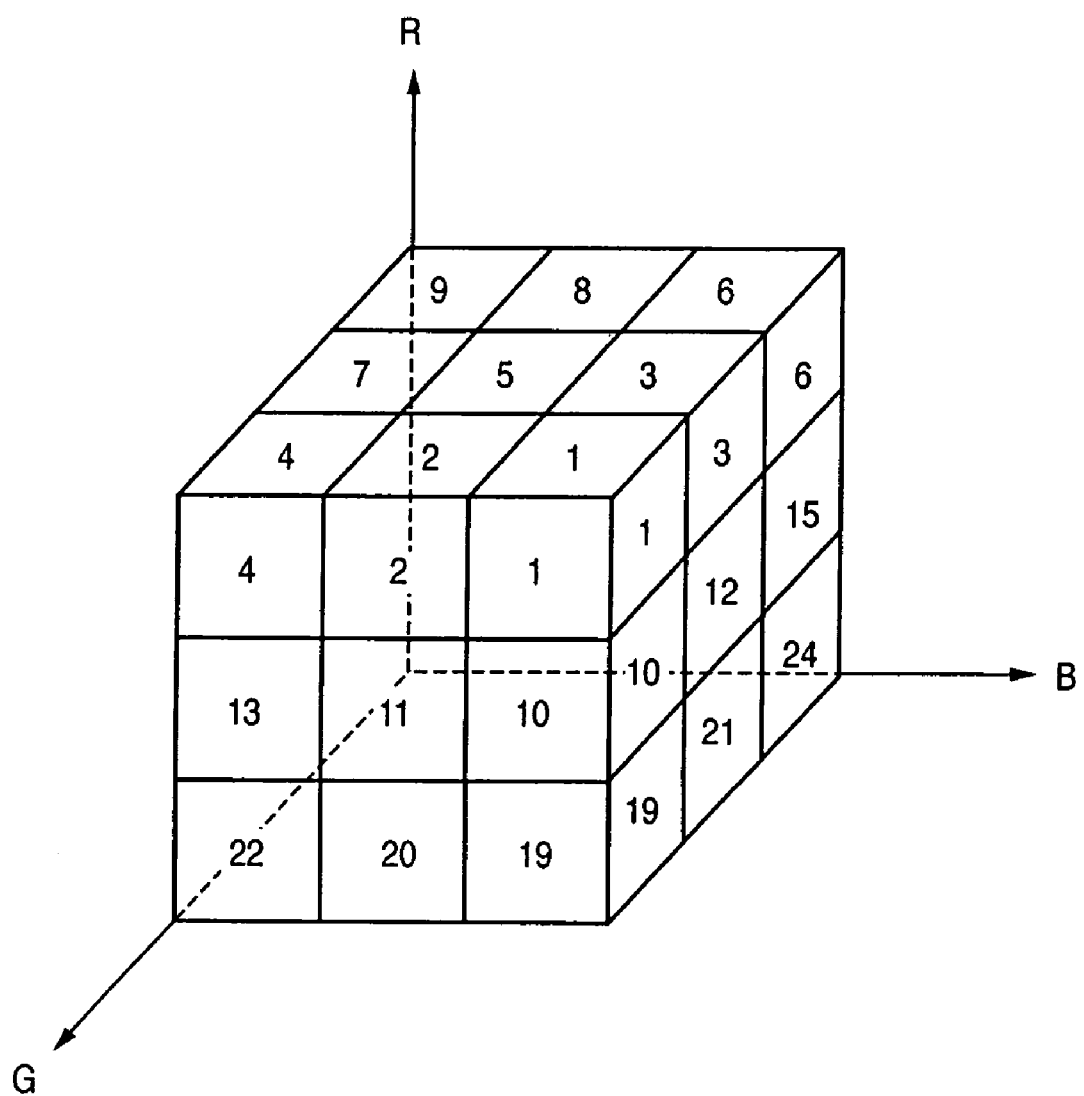
FIG. 11 shows an example of a plurality of partial spaces (color bins) obtained by three-dimensionally segmenting a color space.

The color feature information extraction processing calculates a histogram using a plurality of partial spaces (color bins) obtained by three-dimensionally segmenting a color space, as shown in FIG. 11.

An image is segmented into a plurality of regions to obtain a plurality of segmented regions. A color histogram in each segmented region is generated, an ID of a color bin having a mode color in the generated color histogram is determined as a representative color, and a feature associated with the position of each region is extracted.

A practical example of the color feature information extraction processing will be described in detail below. An example will be described below wherein an image is segmented into 9×9 segmented regions, as shown in FIG. 10, and an RGB color space is equally projected to 27 bins (=3×3×3), as shown in FIG. 11 (in practice, color bins as many as 216=6×6×6 are preferably used).

Figure 10:
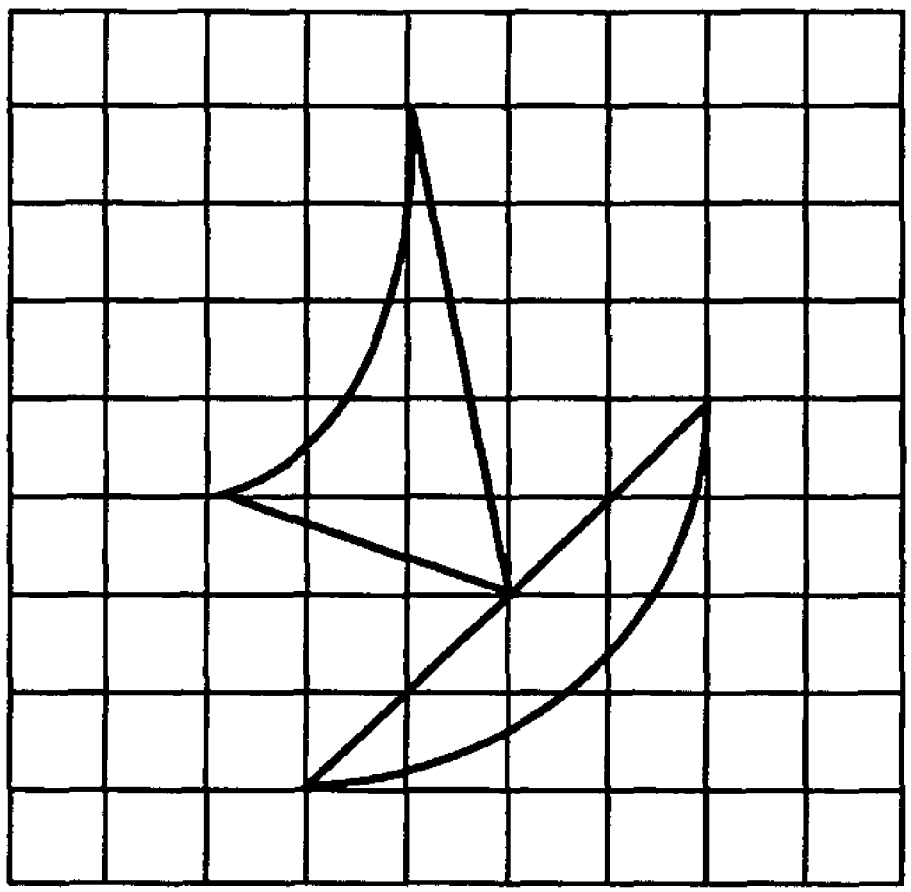
FIG. 10 shows an example of 9×9 segmented regions obtained by segmenting an image.
Figure 12:
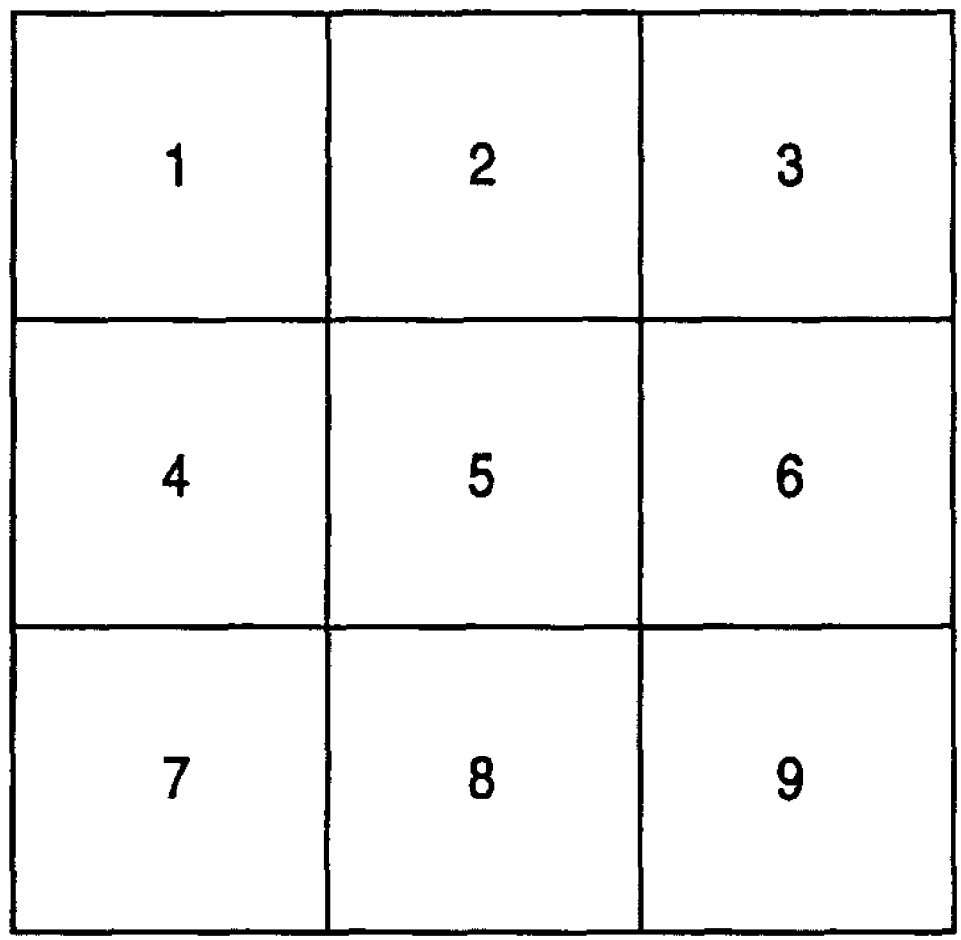
FIG. 12 shows an example of scan of segmented rectangles.

As shown in FIG. 10, an image is segmented into a plurality of segmented regions. In FIG. 10, the image is segmented into 81 (=9×9) regions. However, in practice, the image is preferably segmented into 255 (=15×15) regions. A segmented region of interest is scanned from the left side to the right side, as shown in FIG. 12, to refer to respective pixel values. Colors indicated by the pixel values which are referred to are projected onto the color bins shown in FIG. 11, thus generating a histogram for the color bins (note that FIG. 12 shows a segmentation example of 3×3).

A color bin ID corresponding to the color bin having a highest frequency of occurrence is determined as a representative color of the segmented region of interest. Such processing is applied to all the segmented regions, and a sequence of the color bin IDs in the reference order of segmented regions is output as color feature information.

In step S207, the CPU 101 generates the table shown in FIG. 9 to indicate a region which is located before and after two regions. FIG. 9 shows an example of the configuration of the table which describes the relationship between previous and next regions designated by respective region IDs. That is, the table shown in FIG. 9 registers, as region information for each individual region, a set of the region ID, the region IDs located before and after the region of interest (NULL if no such region is available), the region coordinate position, the region size, the OCR result, the OCR likelihood (obtained upon OCR processing), and the previously obtained feature amount of the image in the region of interest. The external storage device 106 stores the tables shown in FIGS. 8 and 9.

Finally, the CPU 101 increments the number of registered images that form the index management information by one, and the number of registered regions by Nr.

<Logo Search Processing>

Figure 13:
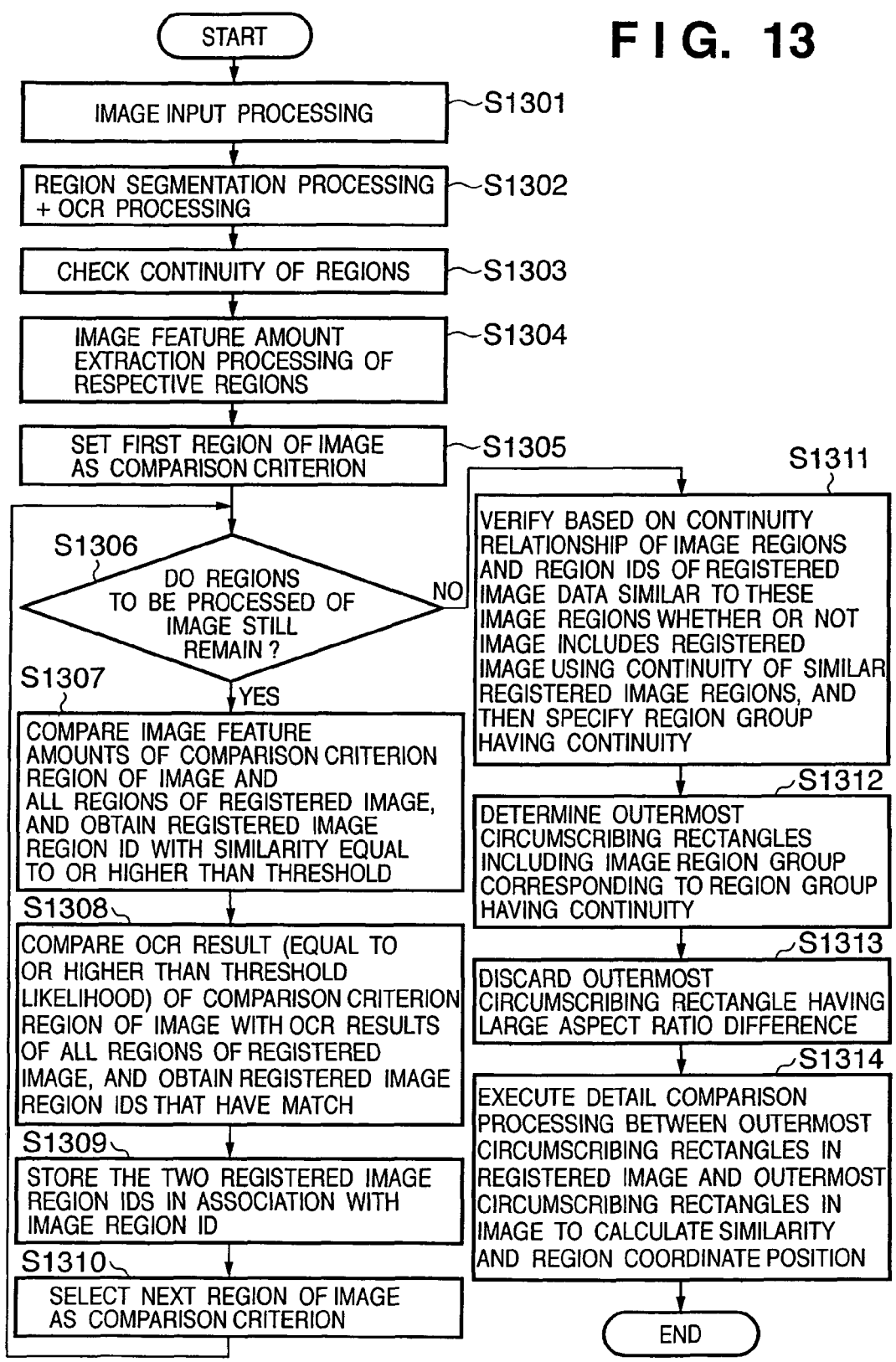
FIG. 13 is a flowchart showing the processing for verifying using information registered by the registration processing whether or not a new image acquired by the image input apparatus 110 or the like onto a RAM 103 includes a logo.

The processing for verifying using the information registered by the aforementioned registration processing whether or not a new image acquired by the image input apparatus 110 onto the RAM 103 includes a logo will be described below using FIG. 13 that shows the flowchart of this processing. Note that programs and data for making the CPU 101 execute the processing according to the flowchart of FIG. 13 are saved in the external storage device 106. These programs and data are loaded onto the RAM 103 as needed under the control of the CPU 101. When the CPU 101 executes the processing using these programs and data, the computer executes respective processes to be described below.

The CPU 101 acquires an image to be verified as to whether or not to include a logo as a image onto the RAM 103 (step S1301). As for the acquisition mode of the image, the CPU 101 may acquire the image by the image input apparatus 110 as in step S201, or may acquire it via the NIC 108 or from the external storage device 106.

The CPU 101 applies the region segmentation+OCR processing to the acquired image as in step S204 (step S1302). As a result, information shown in FIG. 15 is generated on the RAM 103.

The CPU 101 verifies the continuity of respective regions obtained as a result of the region segmentation processing (step S1303). The verification processing in step S1303 will be described in detail below using FIG. 14.

Figure 14:
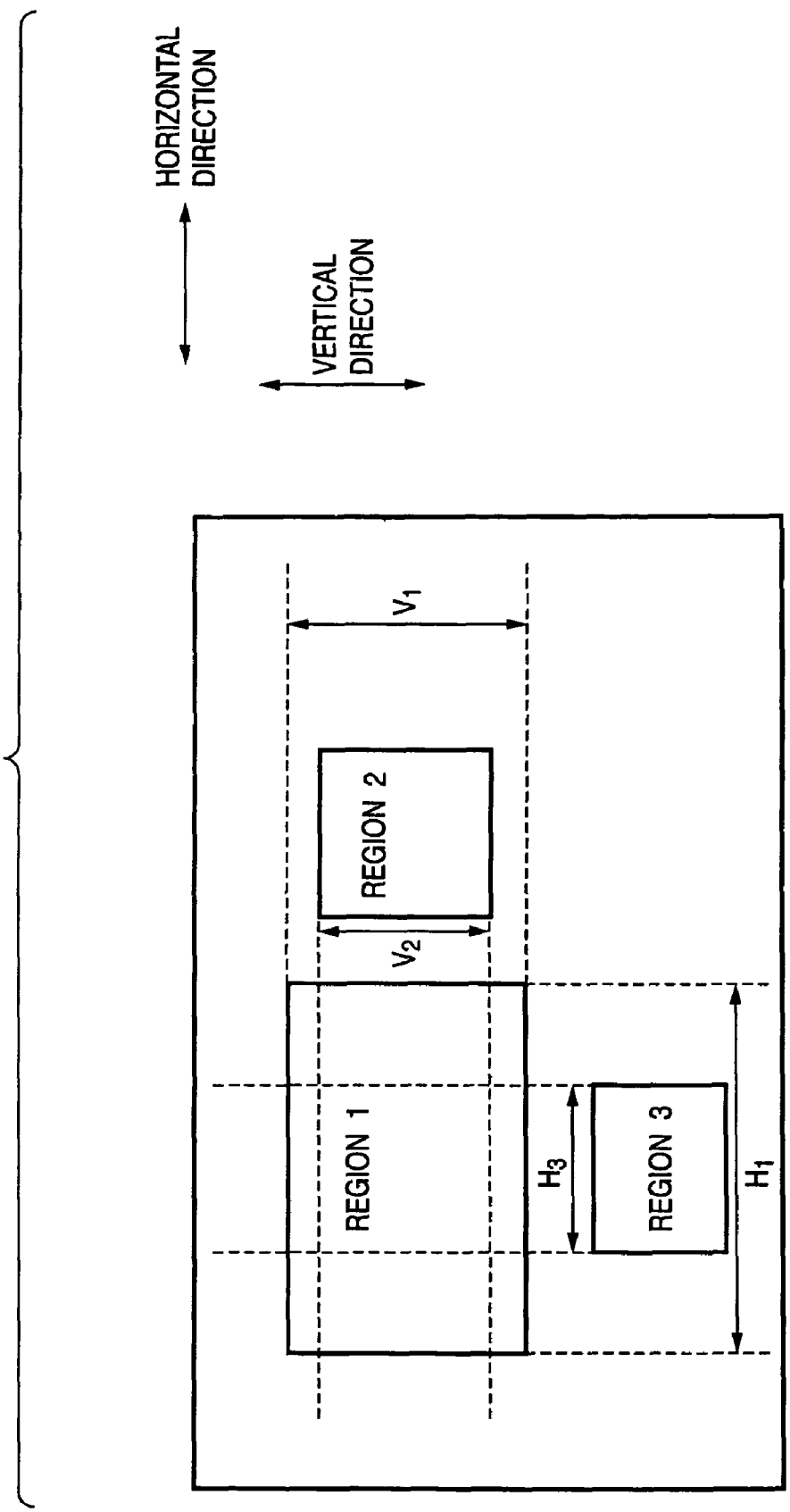
FIG. 14 is a view for explaining verification of continuity of three regions when the three regions (region 1, region 2, and region 3) are obtained as a result of the region segmentation processing.

FIG. 14 is a view for explaining verification of three regions (region 1, region 2, and region 3) when these three regions are obtained as a result of the region segmentation processing.

Paying attention to regions 1 and 2 first, the length of an overlapping portion upon projecting regions 1 and 2 in the horizontal direction is calculated. In FIG. 14, the length of region 1 in the vertical direction is V1, and that of region 2 in the vertical direction is V2. Paying attention to the horizontal direction, since region 1 includes region 2, the length of the overlapping portion between regions 1 and 2 in the horizontal direction is V2. Next, the ratio of the length DV12 which occupies a smaller one of the lengths V1 and V2 is calculated. In this case, since DV12=V2, and V1>V2, V2/V2=1 is calculated. When this ratio is equal to or larger than a predetermined threshold, it is determined that regions 1 and 2 are continuous in the horizontal direction.

The same applies to verification of the continuity in the vertical direction. Paying attention to regions 1 and 3, the length of an overlapping portion upon projecting regions 1 and 3 in the vertical direction is calculated. In FIG. 14, the length of region 1 in the horizontal direction is H1, and that of region 3 in the horizontal direction is H3. Paying attention to the vertical direction, since region 1 includes region 3, the length of the overlapping portion between regions 1 and 3 in the vertical direction is H3. Next, the ratio of the length DH13 which occupies a smaller one of the lengths H1 and H3 is calculated. In this case, since DH13=H3, and H1>H3, H3/H3=1 is calculated. When this ratio is equal to or larger than a predetermined threshold, it is determined that regions 1 and 3 are continuous in the vertical direction.

The aforementioned processing will be generally explained below. In the verification processing of continuity for regions 1, 2, and 3, the following calculations are made:

```
If (V1 > V2)
    ContV = DV12/V2
Else
    ContV = DV12/V1
If (H1 > H3)
    ContH = DH13/H3
Else
    ContH = DH13/H1
```

If ContV is equal to or larger than the predetermined threshold, it is determined that regions 1 and 2 are continuous in the horizontal direction. If ContH is equal to or larger than the predetermined threshold, it is determined that regions 1 and 3 are continuous in the vertical direction. If such continuity is found, and the region IDs of regions 1, 2, and 3 are respectively 1, 2, and 3, the CPU 101 registers the relationship between previous and next regions in a table, as shown in FIG. 16, in step S1303. FIG. 16 shows an example of the configuration of the table which describes the relationship between previous and next regions. For example, paying attention to a region (region 1) of the region ID=1, the CPU 101 registers a set of the region ID of a region located before region 1, the region ID of a region located after region 1, the coordinate position of region 1, the size of region 1, the OCR result for region 1, and the OCR likelihood in the table shown in FIG. 16 as region information.

Referring back to FIG. 13, the CPU 101 calculates the image feature amounts of images in these regions, and registers them in corresponding fields of the table shown in FIG. 16 (step S1304). Note that the CPU 101 calculates image feature amounts of the same type as those calculated in step S207 since these image feature amounts are compared to those calculated in step S207 in the subsequent steps.

The CPU 101 sets the first region (a region of the region ID=1 in FIG. 16) of those registered in the table shown in FIG. 16 as a "comparison criterion" used in the subsequent processes (step S1305). The CPU 101 then checks if all the regions registered in this table are set as the comparison criterion (step S1306). If regions to be set as the comparison criterion still remain, the process advances to step S1307. The CPU 101 executes processing for calculating similarities between the image feature amounts of all the regions of all the images registered in the external storage device 106 with that of the comparison criterion, and specifies the image ID and region ID of the image feature amount which has a highest similarity with the image feature amount of the comparison criterion. That is, the CPU 101 compares the image feature amounts of respective regions of logo objects calculated in step S207 with that of the comparison criterion, and retrieves similar objects (step S1307).

Figure 17:
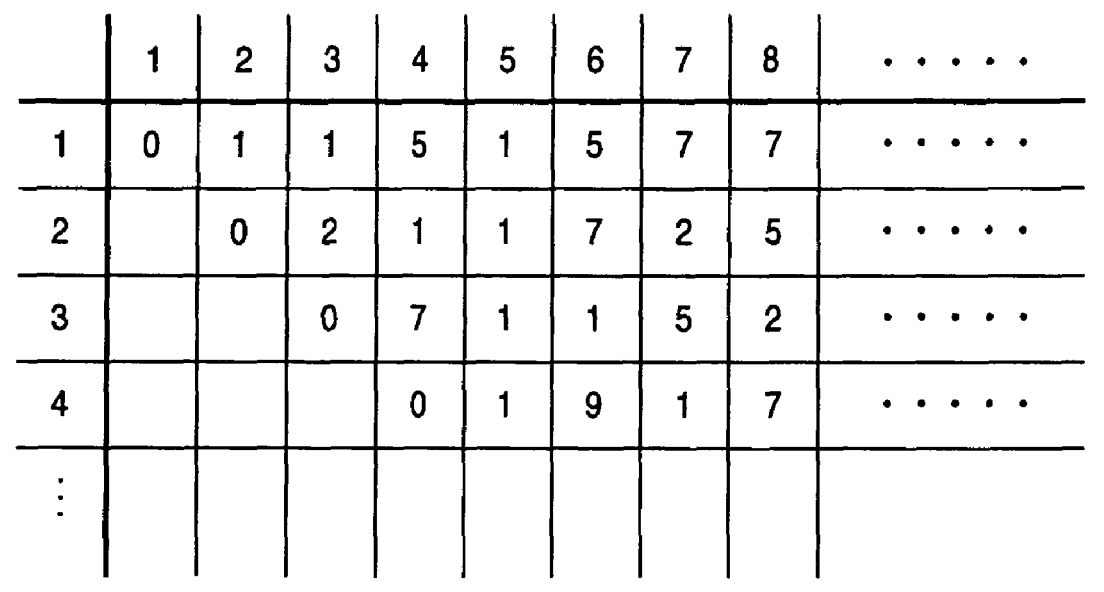

As for calculations of similarities, for example, the CPU 101 generates penalty data of color bin IDs shown in, e.g., FIG. 17 in advance with reference to the geometric distances on the color space, and registers them in the external storage device 106. The CPU 101 then calculates a penalty between the color bin of the comparison criterion and that of the image feature amount of a test region using these data.

Next, the CPU 101 compares the OCR result of the comparison criterion with those (however, those with the predetermined likelihood or more) of all the regions of all the images registered in the external storage device 106 and specifies the image ID and region ID of a region which has the OCR result that matches the OCR result of the comparison criterion (step S1308).

The CPU 101 temporarily stores a set of the image ID and region ID of the comparison criterion, those specified in step S1307, and those specified in step S1308 in the RAM 103 (step S1309). For example, in the specifying processing in step S1308, the specifying result may be "none" in some cases. In such case, the CPU 101 stores, e.g., NULL in a field that stores the specifying result in step S1308.

The CPU 101 sets the next region which is not set as a comparison criterion yet as a comparison criterion with reference to the table in FIG. 16. The process returns to step S1306 to repeat the subsequent processes. As a result, from the two viewpoints, i.e., a region which is similar to the comparison criterion in terms of the image feature amount, and that which matches the comparison criterion in terms of the OCR result, regions which are similar to the comparison criterion can be covered.

On the other hand, if it is determined in step S1306 that no region which is set as a comparison criterion exists, i.e., if all the regions are set as a comparison criterion, the process advances to step S1311. The CPU 101 then executes processing for a candidate of a region corresponding to each region on the image of those specified in steps S1307 and S1308 based on the layout order of these regions (step S1311). The processing in this step will be described in more detail below using a practical example shown in FIG. 18.

FIG. 18 shows the data structure indicating the correspondence between the region in the image and the region IDs of registered image data. FIG. 18 shows an example under the assumption that the registered region ID=4 is similar to the image region ID=1; the registered region ID=2 and ID=3 are similar to the image region ID=2, and the registered region ID=6 is similar to the image region ID=3 as a result of the image feature amount comparison processing.

Regions which should exist before and after the region in the registered image similar to that in the image are collated with reference to the region link relationship (previous region ID and next region ID) included in the table shown in FIG. 9.

According to the table in FIG. 9, the registered region ID=3 can continue after the registered region ID=4, and there is no registered region that follows the registered region ID=3. Therefore, it is determined that the combination of the region ID=1 and region ID=2 is likely to match the registered image ID=1.

On the other hand, according to the table in FIG. 9, the registered region ID=2 cannot continue after the registered region ID=4, and the registered region ID=2 cannot possibly be a registered image by itself. Therefore, there is no registered image which is likely to match the region ID=3 of the image. Also, according to the table in FIG. 9, the registered region ID=6 cannot continue after the registered region ID=4, but the registered region ID=6 can possibly be a registered image by itself. Therefore, it is determined that the region ID=3 of the image is likely to match the registered region ID=2.

With the aforementioned processing, the CPU 101 determines regions corresponding to those on the image, of the regions which are registered in the external storage device 106. Since the regions registered in the external storage device 106 are characters or symbols which form a logo, which of regions on the image corresponds to a logo part candidate (since the region of interest may be a partial region of a logo part or a part including an image other than the logo, it cannot be determined as the logo part in this stage, and is determined as a part candidate) can be determined.

Referring back to FIG. 13, the CPU 101 sets a circumscribing rectangle which includes a part determined as the logo part candidate on the image (step S1312). A plurality of logo part candidates may exist. The CPU 101 excludes a circumscribing rectangle with a large aspect ratio difference from the set circumscribing rectangles (step S1313).

The CPU 101 then resizes image parts in the regions registered in the external storage device 106 so as to be equal to the size of the circumscribing rectangle set for the logo part candidate on the image. As for information associated with the respective regions registered in the external storage device 106, the CPU 101 can refer to the table shown in FIG. 8, which is generated for all the images.

The CPU 101 then executes processing for calculating the absolute values of differences between the pixel values of positionally corresponding pixels in the logo part candidate on the image and those which form the image part (which have already been resized) of the region ($j=1, \ldots, K$) registered in the external storage device 106. The CPU 101 calculates the sum of the absolute values of the differences between the positionally corresponding pixels and substitutes it in Sj. The CPU 101 repeats this processing for all j and all the logo part candidates on the image.

After the sums Sj with all the regions registered in the external storage device 106 are calculated for all the logo part candidates, the CPU 101 specifies the logo part candidates whose Sj is equal to or lower than a predetermined threshold, and displays the coordinate positions of the specified logo part candidate on the display device 107 (step S1314). Note that the information to be displayed is not limited to this, and any other kinds of information may be displayed as long as information is associated with the logo part candidates whose Sj is equal to or lower than the predetermined threshold.

As described above, according to this embodiment, a logo search robust against a logo from which objects are extracted for respective characters in case of a logo which is extracted as a single object, and a logo that does not form one cluster, i.e., a text-based logo can be conducted. If a logo can be retrieved from the image, a logo part detected in the image may be replaced by a logo stored in the external storage device 106. Since the logo as a partial image is replaced by a partial image of a master copy (=original), for example, a logo free from deterioration of image quality can be provided.

Second Embodiment

This embodiment will explain logo search processing different from the first embodiment. The logo search processing according to this embodiment basically executes the processing according to the flowchart shown in FIG. 13, except for the following points.

Figure 19:
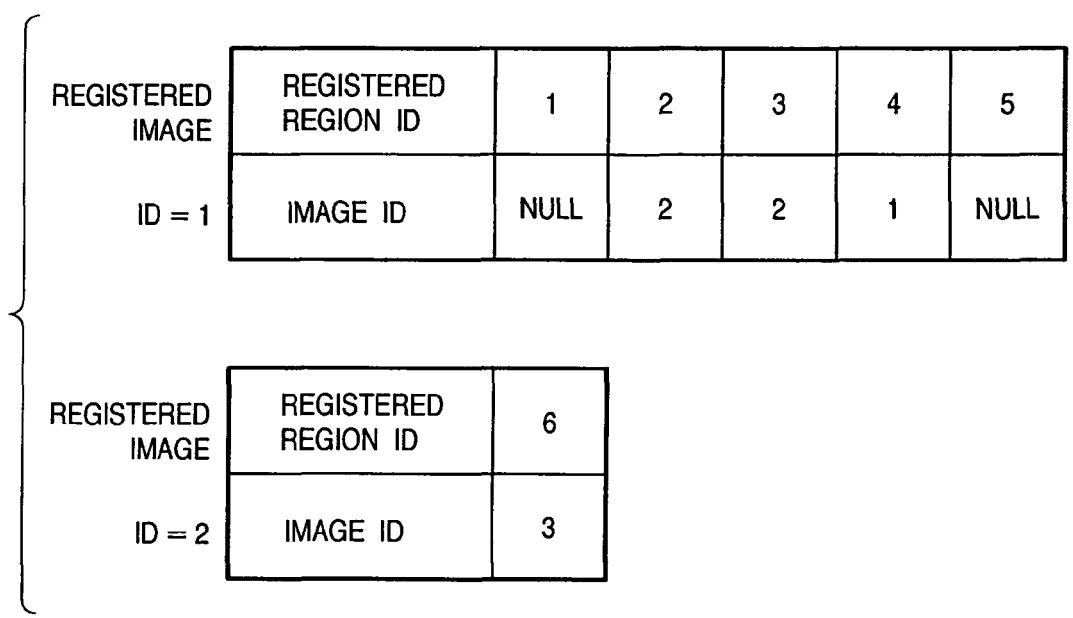
FIG. 19 is a view for explaining processing according to the second embodiment.

In this embodiment, assume that the CPU 101 determines in step S1303 that regions 1 and 2 are continuous in the horizontal direction, and regions 1 and 3 are continuous in the vertical direction, as shown in FIG. 14. Also, assume that images with the image ID=NULL, 2, 2, 1, and NULL correspond to regions (region ID=1 to 5) on an image with the image ID=1 registered in the external storage device 106, and a image with the image ID=3 corresponds to a region (region ID=6) on an image with the image ID=2 registered in the external storage device 106, as shown in the upper table in FIG. 19.

In this case, the CPU 101 perceives that the regions with the region ID=3 and 4 respectively correspond to the images with the ID=1 and 2, and recognizes based on the neighboring information of the registered image regions in FIG. 9 that the layout of the regions with the region ID=3 and 4 suffices to form the image with the ID=1. Therefore, the CPU 101 can determine that the images with the ID=1 and 2 are candidates corresponding to the image with the image ID=1 registered in the external storage device 106.

Also, the CPU 101 perceives that the regions with the region ID=1 and 3 correspond to the regions with the region ID=4 and 6 registered in the external storage device 106, and recognizes based on the neighboring information of the registered image regions in FIG. 9 that the layout of the regions with the region ID=4 and 6 registered in the external storage device 106 does not form any registered image, but the region with the region ID=6 suffices to form the image with the image ID=2 registered in the external storage device 106 by itself. Therefore, the CPU 101 can determine that the region with the region ID=6 is a candidate corresponding to the image with the image ID=2 registered in the external storage device 106.

Other Embodiments

The objects of the present invention can be achieved as follows. That is, a recording medium (or storage medium), which records a program code of software that can implement the functions of the above-mentioned embodiments is supplied to a system or apparatus. A computer (or a CPU or MPU) of the system or apparatus reads out and executes the program code stored in the recording medium. In this case, the program code itself read out from the recording medium implements the functions of the above-mentioned embodiments, and the recording medium which records the program code constitutes the present invention.

When the computer executes the readout program code, an operating system (OS) or the like running on the computer performs some or all of actual processing operations based on an instruction of the program code. The present invention also includes a case wherein the functions of the above-mentioned embodiments are implemented by this processing.

Furthermore, assume that the program code read out from the recording medium is written in a memory of a function extension card or a function extension unit, which is inserted in or connected to the computer. After that, the functions of the above-mentioned embodiments are implemented by some or all of actual processing operations executed by a CPU or the like arranged in the function extension card or function extension unit based on an instruction of the program code. Such case is also included in the present invention.

When the present invention is applied to the recording medium, that recording medium stores program codes corresponding to the aforementioned flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-340918, filed Nov. 25, 2005, which is hereby incorporated by reference herein in its entirety.

What is claimed is:

1. An image processing apparatus comprising:
a first image input unit constructed to input a first image;
a partial region extraction unit constructed to divide the first image into a plurality of partial regions, and to set combined regions each of which includes two or more partial regions;
a feature amount extraction unit constructed to extract feature amounts of the respective partial regions;
a comparison unit constructed to compare the respective extracted feature amounts of partial regions of the first image and feature amounts of a second image which are registered in a database; and
a determination unit constructed to determine a similarity between a feature amount of at least one combined region and a feature amount of a similar region of the second image, wherein the similar region is a circumscribing rectangle including two or more partial regions of the second image each having a feature amount similar to any one of the respective extracted feature amounts of partial regions of the first image.

2. The apparatus according to claim 1, further comprising:
a registered image input unit constructed to input a registered image as the second image;
a setting unit constructed to set a plurality of regions in the registered image;
an extraction unit constructed to extract feature amounts of regions of the registered image, and the plurality of set regions; and
a registration unit constructed to register the feature amounts extracted by said extraction unit, a layout order of regions, and the registered image in the database in association with each other.

3. The apparatus according to claim 2, wherein
said registration unit registers a size of the registered image in the database in association with the registered image, and
the at least one combined region in the first image is based on the size of the registered image.

4. The apparatus according to claim 1, further comprising a display unit constructed to display the at least one combined region on the first image.

5. The apparatus according to claim 1, wherein the feature amount includes at least one of an image feature amount and an OCR result.

6. The apparatus according to claim 1, further comprising:
an aspect ratio determination unit constructed to determine whether the at least one combined region has a large aspect ratio difference,
wherein, in a case where it is determined that the at least one combined region does not have a large aspect ratio difference, the determination unit determines the similarity between the feature amount of the at least one combined region and the feature amount of the similar region of the second image.

7. An image processing method comprising:
a first image input step of inputting a first image into an image processing apparatus;
a partial region extraction step of dividing the first image into a plurality of partial regions;
a setting step of setting combined regions each of which includes two or more partial regions;
a feature amount extraction step of extracting feature amounts of the respective partial regions;
a comparison step of using the image processing apparatus to compare the respective extracted feature amounts of partial regions of the first image and feature amounts of a second image which are registered in a database; and
a determination step of determining a similarity between a feature amount of at least one combined region and a feature amount of a similar region of the second image, wherein the similar region is a circumscribing rectangle including two or more partial regions of the second image each having a feature amount similar to any one of the respective extracted feature amounts of partial regions of the first image.

8. A non-transitory computer-readable storage medium storing a program for making a computer execute an image processing method according to claim 7.

9. The method according to claim 7, further comprising:
an aspect ratio determination step of determining whether the at least one combined region has a large aspect ratio difference,
wherein, in a case where it is determined that the at least one combined region does not have a large aspect ratio difference, the determination step determines the similarity between the feature amount of the at least one combined region and the feature amount of the similar region of the second image.

10. An image processing apparatus comprising:
an input unit constructed to input plural images;
a partial region extraction unit constructed to divide each of the plural images into a plurality of partial regions and extract a layout order of the respective plurality of partial regions from each of the plural images;
a feature amount extraction unit constructed to extract feature amounts of the respective partial regions;
a comparison unit constructed to compare partial regions in a first image and partial regions in a second image, based on the respective feature amounts and the respective layout orders extracted from the first and second images, wherein the first and second images are selected from the plural images;
a setting unit constructed to set combined regions each of which includes two or more partial regions in the first image; and
a determination unit constructed to determine a similarity between a feature amount of at least one combined region and a feature amount of a similar region of the second image, wherein the similar region is a circumscribing rectangle including two or more partial regions of the second image each having a feature amount similar to any one of the respective extracted feature amounts of partial regions of the first image.

11. The apparatus according to claim 10, further comprising:
an aspect ratio determination unit constructed to determine whether the at least one combined region has a large aspect ratio difference,
wherein, in a case where it is determined that the at least one combined region does not have a large aspect ratio difference, the determination unit determines the similarity between the feature amount of the at least one combined region and the feature amount of the similar region of the second image.

12. An image processing method comprising:
an input step of inputting plural images into an image processing apparatus;
a partial region extraction step of dividing each of the plural images into a plurality of partial regions and extracting a layout order of the respective plurality of partial regions from each of the plural images;
a feature amount extraction step of extracting feature amounts of the respective partial regions;
a comparison step of using the image processing apparatus to compare partial regions in a first image and partial regions in a second image, based on the respective feature amounts and the respective layout orders extracted from the first and second images, wherein the first and second images are selected from the plural images;
a setting step of setting combined regions each of which includes two or more partial regions in the first image; and
a determination step of determining a similarity between a feature amount of at least one combined region and a feature amount of a similar region of the second image, wherein the similar region is a circumscribing rectangle including two or more partial regions of the second image each having a feature amount similar to any one of the respective extracted feature amounts of partial regions of the first image.

13. The method according to claim 12, further comprising:
an aspect ratio determination step of determining whether the at least one combined region has a large aspect ratio difference,
wherein, in a case where it is determined that the at least one combined region does not have a large aspect ratio difference, the determination step determines the similarity between the feature amount of the at least one combined region and the feature amount of the similar region of the second image.

* * * * *